United States Patent
Lim

(10) Patent No.: US 10,890,240 B2
(45) Date of Patent: Jan. 12, 2021

(54) POWER TRANSMISSION APPARATUS

(71) Applicant: SEJIN-IGB CO., LTD., Asan-si (KR)

(72) Inventor: Sun Ho Lim, Asan-si (KR)

(73) Assignee: SEJIN-IGB CO., LTD.

( * ) Notice: Subject to any disclaimer, the term of this patent is extended or adjusted under 35 U.S.C. 154(b) by 0 days.

(21) Appl. No.: 15/557,468

(22) PCT Filed: Feb. 17, 2016

(86) PCT No.: PCT/KR2016/001587
§ 371 (c)(1),
(2) Date: Sep. 11, 2017

(87) PCT Pub. No.: WO2016/144015
PCT Pub. Date: Sep. 15, 2016

(65) Prior Publication Data
US 2018/0066743 A1 Mar. 8, 2018

(30) Foreign Application Priority Data
Mar. 12, 2015 (KR) .................. 10-2015-0034193

(51) Int. Cl.
*F16H 55/08* (2006.01)
*F16H 55/26* (2006.01)
(Continued)

(52) U.S. Cl.
CPC .............. *F16H 55/08* (2013.01); *F16H 7/00* (2013.01); *F16H 19/04* (2013.01); *F16H 55/26* (2013.01); *F16H 55/10* (2013.01)

(58) Field of Classification Search
CPC . F16H 55/08; F16H 7/00; F16H 19/04; F16H 55/26; F16H 55/10
(Continued)

(56) References Cited

U.S. PATENT DOCUMENTS 3,888,357 A * 6/1975 Bauer .................... B66C 23/84
212/175
4,183,585 A * 1/1980 Brennan ................. E21C 29/02
105/29.1
(Continued)

FOREIGN PATENT DOCUMENTS

DE 10103490 A1 8/2002
JP 06155161 A 6/1994
(Continued)

OTHER PUBLICATIONS

Masset, Candle, "Supplementary European Search Report", European Patent Office, 80298 Munich, Germany.

*Primary Examiner* — Victor L MacArthur
*Assistant Examiner* — Gregory Robert Weber
(74) *Attorney, Agent, or Firm* — Renaissance IP Law Group LLP

(57) ABSTRACT

Provided is a power transmission apparatus. The power transmission apparatus includes a rectilinear rack allowing a pinion to perform a rectilinear motion by interacting with the pinion, a curvilinear rack allowing the pinion to perform a curvilinear motion by interacting with the pinion, and a rectilinear-curvilinear conversion rack connected to the rectilinear rack and the curvilinear rack between the rectilinear rack and the curvilinear rack, and converting the rectilinear motion and the curvilinear motion of the pinion.

5 Claims, 13 Drawing Sheets

(51) Int. Cl.
*F16H 7/00* (2006.01)
*F16H 19/04* (2006.01)
*F16H 55/10* (2006.01)

(58) Field of Classification Search
USPC .......................................................... 74/422
See application file for complete search history.

(56) References Cited

U.S. PATENT DOCUMENTS

| | | | | | |
|---|---|---|---|---|---|
| 4,260,189 | A | * | 4/1981 | Periou | B60J 7/053 296/223 |
| 5,667,020 | A | * | 9/1997 | Palmer | E02F 3/764 172/781 |
| 6,910,397 | B2 | * | 6/2005 | Schapiro | F16H 35/00 74/109 |
| 7,902,708 | B2 | * | 3/2011 | Elmaleh | B60K 7/0007 310/156.43 |
| 8,287,238 | B2 | * | 10/2012 | DiMascio | F16H 55/12 415/129 |
| 10,378,636 | B2 | * | 8/2019 | Brown | F16H 55/17 |
| 2005/0196280 | A1 | * | 9/2005 | Gonzalez | F03D 7/0204 416/131 |
| 2008/0047773 | A1 | * | 2/2008 | Halliday | F16H 19/04 180/400 |
| 2009/0220343 | A1 | * | 9/2009 | Dimascio | F16H 55/12 416/161 |
| 2013/0186213 | A1 | * | 7/2013 | Lim | F16H 19/04 74/31 |
| 2013/0192487 | A1 | * | 8/2013 | Fanshawe | B61B 13/02 104/118 |

FOREIGN PATENT DOCUMENTS

| | | | |
|---|---|---|---|
| JP | 06062760 U | | 9/1994 |
| JP | H11129896 A | | 5/1999 |
| JP | H11-129896 A | * | 8/1999 |
| JP | 2002354770 A | * | 12/2002 |
| JP | 2013533442 A | | 8/2013 |
| KR | 100945193 B1 | | 3/2010 |
| KR | 101009742 B1 | | 1/2011 |
| KR | 20130117489 A | * | 10/2013 |
| KR | 20130117489 A | | 10/2013 |

* cited by examiner

POWER TRANSMISSION APPARATUS

TECHNICAL FIELD

The present inventive concept relates to a power transmission apparatus, and more particularly, to a power transmission apparatus which may enable a continuous connection between a linear tooth shape and a curved tooth shape, thereby implementing continuous rectilinear and curvilinear motions of an INDEX applied to semiconductor or flat display equipment.

BACKGROUND ART

Power transmission apparatuses may be applied to various industrial machines including semiconductor equipment, flat display equipment for LCDs, PDPs, or OLEDs, etc., to implement a rectilinear or curvilinear motion.

In other words, a power transmission apparatus may implement a rectilinear or curvilinear motion according to interaction of a rack and a pinion based on rotation power of a motor.

For example, when a rack is a rectilinear type, an object to be moved may perform a rectilinear motion by interaction with a pinion. When the rack is a curvilinear type, the object to be moved may perform a curvilinear motion by the interaction with the pinion.

Accordingly, the rectilinear or curvilinear motion of various industrial machines such as an INDEX may be implemented by appropriately combining the rack and the pinion based on structures and functions.

To independently implement a rectilinear motion and a curvilinear motion, a rectilinear rack or a curvilinear rack is solely employed and a pinion is combined corresponding to the rack.

However, in order to continuously implement the rectilinear motion and the curvilinear motion without interruption, the rectilinear rack and the curvilinear rack are used by being connected to each other. In particular, when a tooth shape curve of the rectilinear rack or the curvilinear rack is a cycloid curve or a trochoid curve, the connection of the rectilinear rack and the curvilinear rack is not easy due to a structural limit caused by different curvatures thereof.

In other words, according to the related art, a continuous connection between the linear tooth shape of a rectilinear rack and the curved tooth shape of a curvilinear rack is not easy.

As such, when the continuous connection between the linear tooth shape of a rectilinear rack and the curved tooth shape of a curvilinear rack is not easy, there may be may restrictions in the application of a power transmission apparatus to equipment, for example, a continuous rectilinear and curvilinear motion of an INDEX equipment widely applied to semiconductor or flat panel equipment. Considering the above, a structural improvement to the power transmission apparatus capable of solving the above matters is needed.

DETAILED DESCRIPTION OF THE INVENTIVE CONCEPT

Technical Problem

The present inventive concept provides a power transmission apparatus which may enable a continuous connection between a linear tooth shape and a curved tooth shape, thereby implementing continuous rectilinear and curvilinear motions of an INDEX applied to semiconductor or flat display equipment.

Advantageous Effects

According to the present inventive concept, the continuous connection between a linear tooth shape and a curved tooth shape is possible and thus continuous rectilinear and curvilinear motions of an INDEX applied to semiconductor or flat display equipment may be implemented.

BEST MODE

Figure 1:
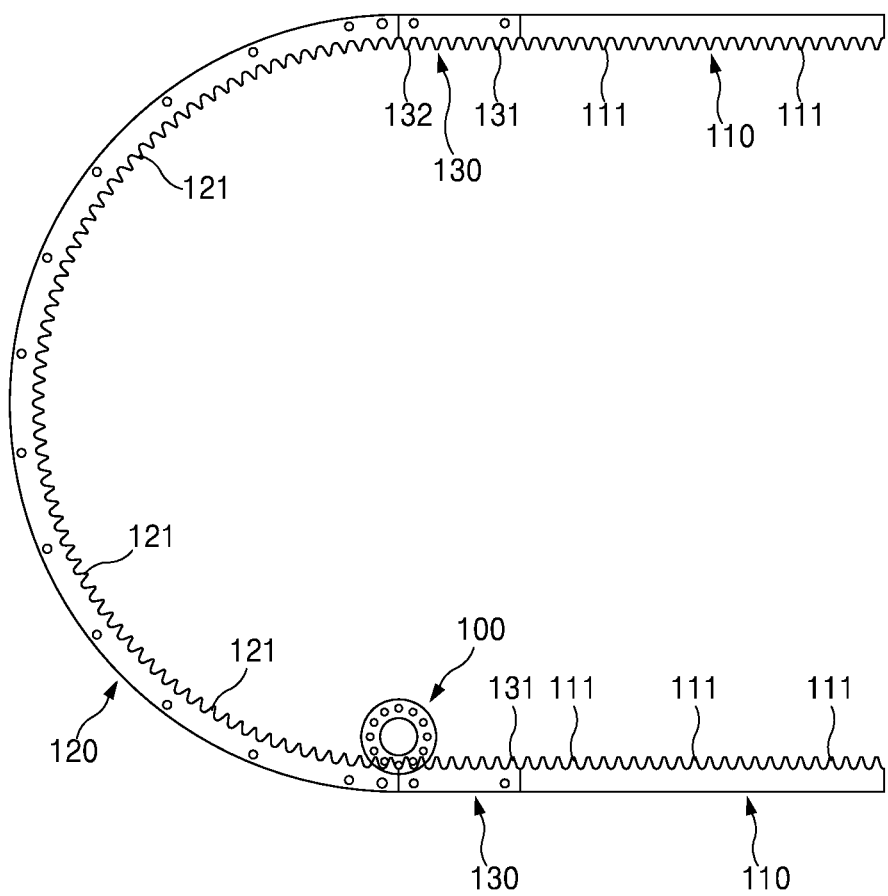
FIG. 1 is a structural plan view of a power transmission apparatus according to a first embodiment of the present inventive concept.

According to an aspect of the present inventive concept, a power transmission apparatus includes a rectilinear rack allowing a pinion to perform a rectilinear motion by interacting with the pinion, a curvilinear rack allowing the pinion to perform a curvilinear motion by interacting with the pinion, and a rectilinear-curvilinear conversion rack connected to the rectilinear rack and the curvilinear rack between the rectilinear rack and the curvilinear rack, and converting the rectilinear motion and the curvilinear motion of the pinion.

The rectilinear-curvilinear conversion rack may include a rectilinear part having a rectilinear tooth and connected to the rectilinear rack, and a rectilinear-curvilinear conversion part having a rectilinear-curvilinear conversion tooth and having one side connected to the rectilinear part and other part connected to the curvilinear rack.

The rectilinear part and the rectilinear-curvilinear conversion part may be integrally formed.

The rectilinear tooth may be provided in a plural number on the rectilinear part.

The rectilinear-curvilinear conversion tooth provided in the rectilinear-curvilinear conversion part may be one or two.

Tooth shapes of opposite side surfaces of the rectilinear-curvilinear conversion tooth may be asymmetrically formed with respect to a centerline.

A curvature of a first tooth shape formed at one side surface of the rectilinear-curvilinear conversion tooth may match a curvature of tooth shapes of teeth formed at the curvilinear rack.

A curvature of a second tooth shape formed at other side surface of the rectilinear-curvilinear conversion tooth may match a curvature of tooth shaped of teeth formed at the rectilinear rack.

Tooth shape curves of the rectilinear rack, the curvilinear rack, and the rectilinear-curvilinear conversion rack may be cycloid curves or trochoid curves.

According to another aspect of the present inventive concept, a power transmission apparatus includes a rectilinear rack allowing a pinion to perform a rectilinear motion by interacting with the pinion, and a curvilinear rack connected to the rectilinear rack and allowing the pinion to perform a curvilinear motion by interacting with the pinion, in which a rectilinear-curvilinear conversion tooth for converting the rectilinear motion and the curvilinear motion of the pinion therebetween is formed at an end portion of the rectilinear rack connected to the curvilinear rack.

One or two rectilinear-curvilinear conversion teeth may be provided as the rectilinear-curvilinear conversion tooth, and tooth shapes of opposite side surfaces of the rectilinear-curvilinear conversion tooth may be asymmetrically formed with respect to a centerline.

A curvature of a first tooth shape formed at one side surface of the rectilinear-curvilinear conversion tooth may match a curvature of tooth shapes of teeth formed at the curvilinear rack. A curvature of a second tooth shape formed at other side surface of the rectilinear-curvilinear conversion tooth may match a curvature of tooth shaped of teeth formed at the rectilinear rack. Tooth shape curves of the rectilinear rack, the curvilinear rack, and the rectilinear-curvilinear conversion rack may be cycloid curves or trochoid curves.

The pinion may include a plurality of power transfer pins having an arrangement structure of a circular shape and rotating corresponding to tooth shapes of the rectilinear rack and the curvilinear rack.

The pinion may further include a pin rotation support part connected to the power transfer pins and rotatably supporting the power transfer pins, and an external rotor motor portion arranged inside a radial direction of the pin rotation support part and connected to the pin rotation support part, and generating rotational power to rotate the pin rotation support part arranged outside the external rotor motor portion.

The pin rotation support part may rotatably support the power transfer pin and comprises a rotor connection body forming one body with the rotor, and the rotor connection body may be arranged in a pair respectively at opposite end portions of the power transfer pins and connected to the power transfer pins.

The external rotor motor portion may include a rotor connected to the pin rotation support part inside the radial direction of the pin rotation support part, and rotating with the pin rotation support part; and a stator fixedly arranged inside a radial direction of the rotor and rotating the rotor by an applied current.

[Mode of the Inventive Concept]

The attached drawings for illustrating preferred embodiments of the present inventive concept are referred to in order to gain a sufficient understanding of the present inventive concept, the merits thereof, and the objectives accomplished by the implementation of the present inventive concept.

Hereinafter, the present inventive concept will be described in detail by explaining preferred embodiments of the inventive concept with reference to the attached drawings. Like reference numerals in the drawings denote like elements.

Figure 2:
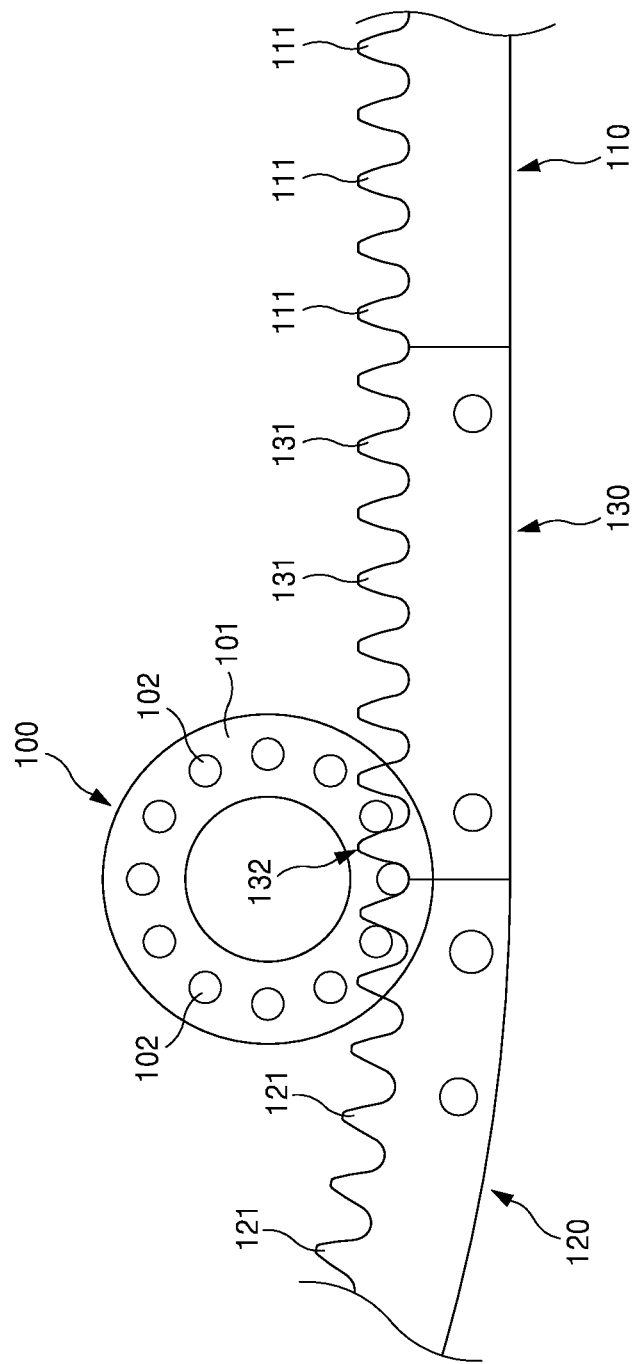
FIG. 2 is an enlarged view of a major part of FIG. 1.
Figure 3:
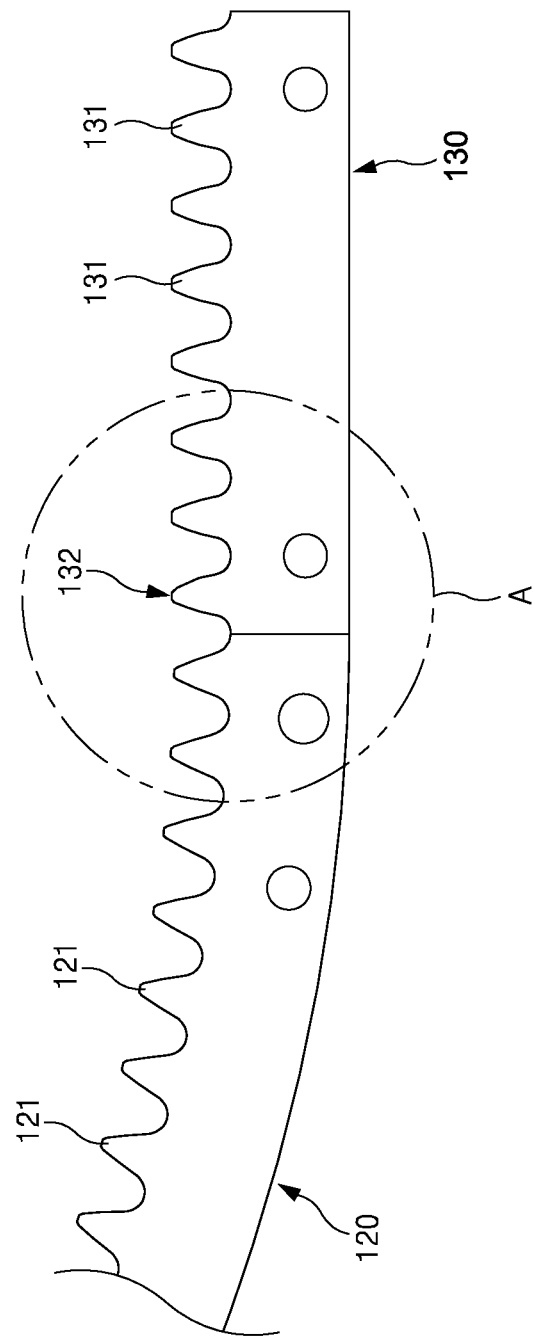
FIG. 3 is an enlarged view of the major part of FIG. 2, in which a pinion is removed.
Figure 4:
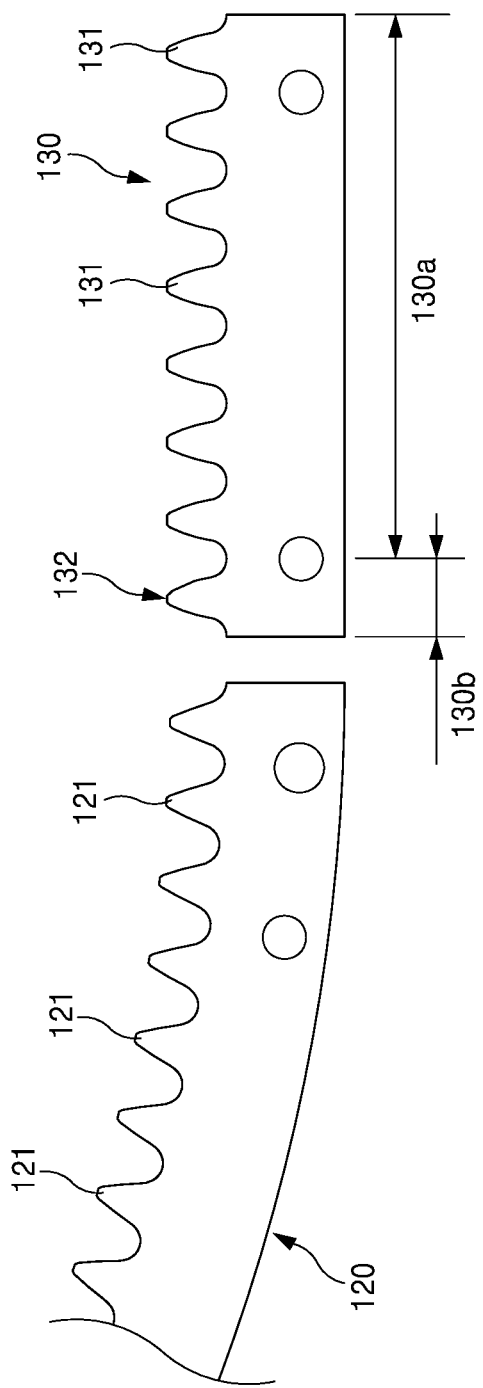
FIG. 4 is a disassembled view of FIG. 3.
Figure 5:
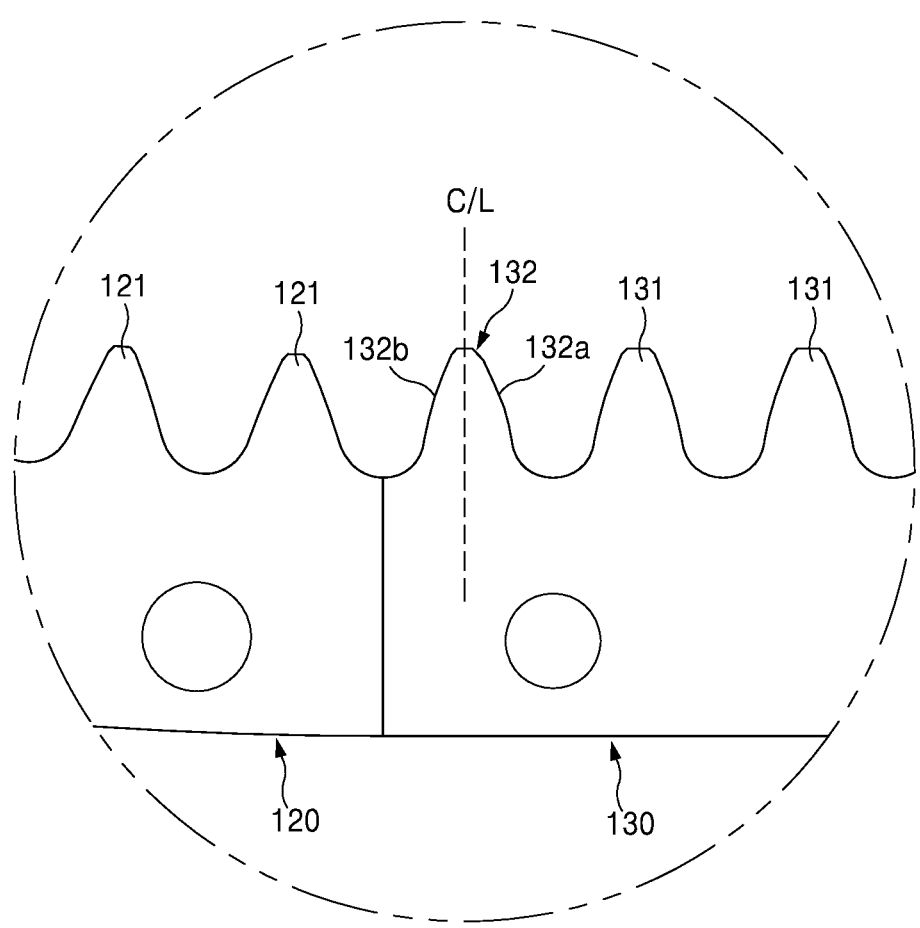
FIG. 5 is an enlarged view of an area A of FIG. 3.

FIG. 1 is a structural plan view of a power transmission apparatus according to a first embodiment of the present inventive concept. FIG. 2 is an enlarged view of a major part of FIG. 1. FIG. 3 is an enlarged view of the major part of FIG. 2, in which a pinion is removed. FIG. 4 is a disassembled view of FIG. 3. FIG. 5 is an enlarged view of an area A of FIG. 3.

Referring to these drawings, the power transmission apparatus according to the present embodiment may enable a continuous connection between a linear tooth shape and a curved tooth shape, thereby implementing continuous rectilinear and curvilinear motions of an INDEX applied to semiconductor or flat display equipment. The power transmission apparatus may include a pinion 100, a rectilinear rack 110 allowing the pinion 100 to perform a rectilinear motion, a curvilinear rack 120 allowing the pinion 100 to perform a curvilinear motion, and a rectilinear-curvilinear conversion rack 130 converting the rectilinear motion and the curvilinear motion of the pinion 100.

First, while rotating and moving along a trajectory of the rectilinear rack 110, the rectilinear-curvilinear conversion rack 130, and the curvilinear rack 120, the pinion 100 may perform a rectilinear motion or a curvilinear motion. In other words, the pinion 100 may move along the trajectory of the rectilinear rack 110, the rectilinear-curvilinear conversion rack 130, and the curvilinear rack 120, or reversely along the curvilinear rack 120, the rectilinear-curvilinear conversion rack 130, and the rectilinear rack 110.

In the present embodiment, the pinion 100, as in FIGS. 1 and 2, rotates by inscribing the rectilinear rack 110, the rectilinear-curvilinear conversion rack 130, and the curvilinear rack 120, and performs a rectilinear motion or a curvilinear motion. A case of circumscribing is possible, which is described later.

The pinion 100 may include a pinion body 101 having a disc shape and a plurality of power transfer pins 102 coupled to the pinion body 101.

The power transfer pins 102 have an arrangement structure of a circular shape in the pinion body 101, and are rotated corresponding to tooth shapes of teeth 111, 131, 132, and 121 formed on the rectilinear rack 110, the rectilinear-curvilinear conversion rack 130, and the curvilinear rack 120.

A plurality of parts may be added to the pinion 10 for the rotation of the power transfer pins 102.

Accordingly, in addition to the pinion 100 illustrated in the drawings, various pinions such as a lubrication hole pinion, a pinion with a built-in decelerator, or an outer-rotor motor type pinion, which are not illustrated, may be used as the pinion 100. Application of any pinion may be said to be within the scope of rights of the present inventive concept.

Among the various types of pinions, an outer-rotor motor type pinion is described in a following embodiment, and is omitted herein.

Next, the rectilinear rack 110 allows the pinion 100 to perform a rectilinear motion by interaction with the pinion 100, and the curvilinear rack 120 allows the pinion 100 to perform a curvilinear motion by interaction with the pinion 100.

In the present embodiment, as illustrated in FIG. 1, the rectilinear-curvilinear conversion rack 130 is connected to each of opposite end portions of the curvilinear rack 120 having an approximately semi-circular shape, and then the rectilinear rack 110 is connected each rectilinear-curvilinear conversion rack 130.

As described above, in order to have a rectilinear motion and a curvilinear motion of the pinion 100 continuously implemented without interruption, the rectilinear rack 110 and the curvilinear rack 120 are connected to each other. To this end, the rectilinear-curvilinear conversion rack 130 is employed.

The rectilinear-curvilinear conversion rack 130 is connected to the rectilinear rack 110 and the curvilinear rack 120 between the rectilinear rack 110 and the curvilinear rack 120, and converts the rectilinear motion and the curvilinear motion of the pinion 100.

When the tooth shape curves of the rectilinear rack 110 and the curvilinear rack 120 are cycloid curves or trochoid curves, the rectilinear rack 110 and the curvilinear rack 120 are difficult to simply connect each other due to a structural limit caused by different curvatures thereof.

For reference, a cycloid curve is the trace produced by a point on the circumference of a wheel rolling on a linear line. In contract, a trochoid curve is the trace produced by a fixed point not on the circumference of a rolling circle, but located inside or outside the circle.

When the teeth 111 and 121 of the rectilinear rack 110 and the curvilinear rack 120 are formed by using the cycloid curve and the trochoid curve, the rectilinear rack 110 and the curvilinear rack 120 are difficult to connect to each other due to a structural limit caused by different curvatures of the teeth 111 and 121. Accordingly, there has been no example of using the cycloid curve and the trochoid curve in the above way until now.

However, in the present embodiment, since the rectilinear rack 110 and the curvilinear rack 120 are connected by using the rectilinear-curvilinear conversion rack 130, even when the tooth shape curves of the rectilinear rack 110 and the curvilinear rack 120 are cycloid curves or trochoid curves, the rectilinear rack 110 and the curvilinear rack 120 may be flexibly and easily connected to each other without interruption as illustrated in FIG. 1.

When the rectilinear rack 110 and the curvilinear rack 120 are flexibly connected by the rectilinear-curvilinear conversion rack 130 as illustrated in FIG. 1, the power transmission apparatus may be applied to continuous rectilinear and curvilinear motions of INDEX equipment widely applied to a semiconductor or flat panel display apparatus. Accordingly, a utilization range of the power transmission apparatus may be much increased.

The rectilinear-curvilinear conversion rack 130 according to the present embodiment may include a rectilinear part 130a having a rectilinear tooth 131 connected to the rectilinear rack 110, and a rectilinear-curvilinear conversion part 130b having a rectilinear-curvilinear conversion tooth 132 and having one side connected to the rectilinear tooth 131 of the rectilinear part 130a and the other side connected to the curvilinear rack 120.

In this state, the rectilinear part 130a and the rectilinear-curvilinear conversion part 130b may be coupled to each other as separate parts in terms of a tooth shape. However, considering the action and reaction needed for power transmission, the rectilinear part 130a and the rectilinear-curvilinear conversion part 130b may be integrally manufactured for application.

The rectilinear tooth 131 provided on the rectilinear part 130a has substantially the same tooth shape as the teeth 111 of the rectilinear rack 110. The rectilinear tooth 131 provided on the rectilinear part 130a may be preferably plural, for example, at least three or four teeth.

The rectilinear-curvilinear conversion tooth 132 provided in the rectilinear-curvilinear conversion part 130b may be one or two.

It may be considered that the rectilinear-curvilinear conversion tooth 132 may also be three or more. However, in this case, the pinion 100 that is pricy becomes too large, which is not practical. Accordingly, one or two rectilinear-curvilinear conversion teeth 132 may be provided on an end portion of the rectilinear-curvilinear conversion rack 130.

As the rectilinear-curvilinear conversion tooth 132 is connected to the curvilinear rack 120, the rectilinear-curvilinear conversion tooth 132 converts the rectilinear motion of the pinion 100 to a curvilinear motion, or the curvilinear motion of the pinion 100 to a rectilinear motion.

First and second tooth shapes 132a and 132b at opposite side surfaces of the rectilinear-curvilinear conversion tooth 132 are asymmetrically formed with respect to a centerline C/L of FIG. 5. In other words, the curvatures of the tooth shapes 132a and 132b at the opposite side surfaces of the rectilinear-curvilinear conversion tooth 132 are different from each other with respect to the centerline C/L.

Since the tooth shapes 132a and 132b are asymmetrically formed at the opposite side surfaces of the rectilinear-curvilinear conversion tooth 132 as in the present embodiment, even when the tooth shape curves of the rectilinear rack 110 and the curvilinear rack 120 are cycloid curves or trochoid curves, the rectilinear rack 110 and the curvilinear rack 120 may be easily connected to each other as illustrated in FIG. 1.

In addition, when the power transfer pins 102 of the pinion 100 rotate and move along the teeth 111 and 121 of the rectilinear rack 110 and the curvilinear rack 120, as illustrated in FIG. 2, the pinion 100 may be stably move without escape from the trajectory.

In this state, the curvature of the first tooth shape 132a formed at one side surface of the rectilinear-curvilinear conversion tooth 132 may match the curvature of the tooth shapes of the teeth 121 formed on the curvilinear rack 120. The curvature of the second tooth shape 132b formed at the other side surface of the rectilinear-curvilinear conversion tooth 132 may match the curvature of the tooth shape of the teeth 111 formed on the rectilinear rack 110.

For reference, the curvature of the first tooth shape 132a varies according to the designed curvilinear motion form, that is, a deceleration rate, a tooth contact rate, an amount of electric potential, etc., whereas the curvature of the second tooth shape 132b varies according to the designed rectilinear motion form, that is, a tooth contact rate, an amount of transfer per one rotation, an amount of electric potential, etc. Accordingly, there may be numerous combinations thereof.

As described above, when the rectilinear rack 110 and the curvilinear rack 120 are connected by using the rectilinear-curvilinear conversion rack 130, the rectilinear motion or the curvilinear motion of the pinion 100 may be continuously performed.

According to the present embodiment having the above-described structure and operation, the continuous connection between a linear tooth shape and a curved tooth shape may be possible, thereby implementing continuous rectilinear and curvilinear motions of the INDEX applied to semiconductor or flat display equipment.

Figure 6:
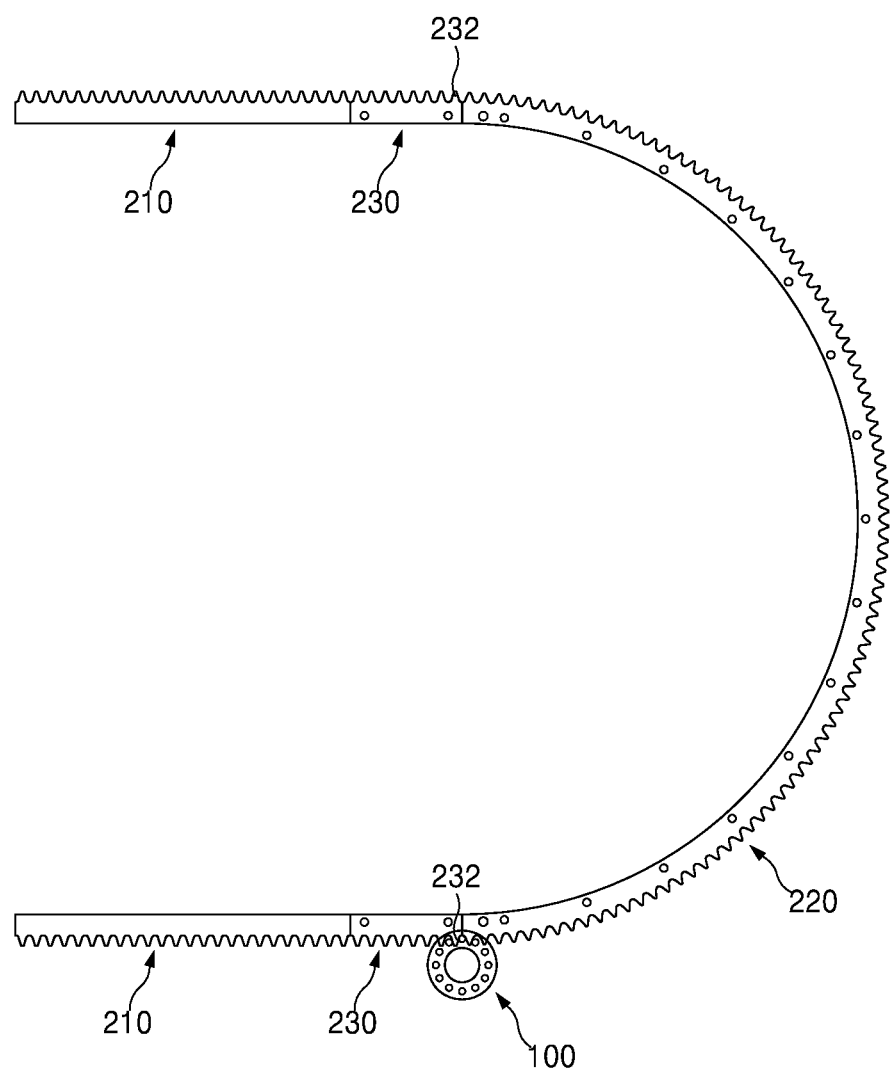
FIG. 6 is a structural plan view of a power transmission apparatus according to a second embodiment of the present inventive concept.

FIG. 6 is a structural plan view of a power transmission apparatus according to a second embodiment of the present inventive concept.

Referring to FIG. 6, the power transmission apparatus according to the present embodiment employs a rectilinear-curvilinear conversion rack 230 having a rectilinear-curvilinear conversion tooth 232 to connect a rectilinear rack 210 and a curvilinear rack 220 having an approximately semi-circular shape.

Unlike the above-described embodiment, the pinion 100 may rotate circumscribing the rectilinear rack 210, the rectilinear-curvilinear conversion rack 230, and the curvilinear rack 220, and perform a rectilinear motion or a curvilinear motion. In other words, the pinion 100 may continuously perform the rectilinear motion, the curvilinear motion, and the rectilinear motion without interruption.

As such, even when the pinion 100 circumscribes the racks, the rectilinear-curvilinear conversion rack 230 having the rectilinear-curvilinear conversion tooth 232 is employed and thus the rectilinear rack 210 and the curvilinear rack 220 may be flexibly connected to each other.

Even when the structure of the present embodiment is employed, the continuous connection between a linear tooth shape and a curved tooth shape may be possible, thereby implementing continuous rectilinear and curvilinear motions of the INDEX applied to semiconductor or flat display equipment.

Figure 7:
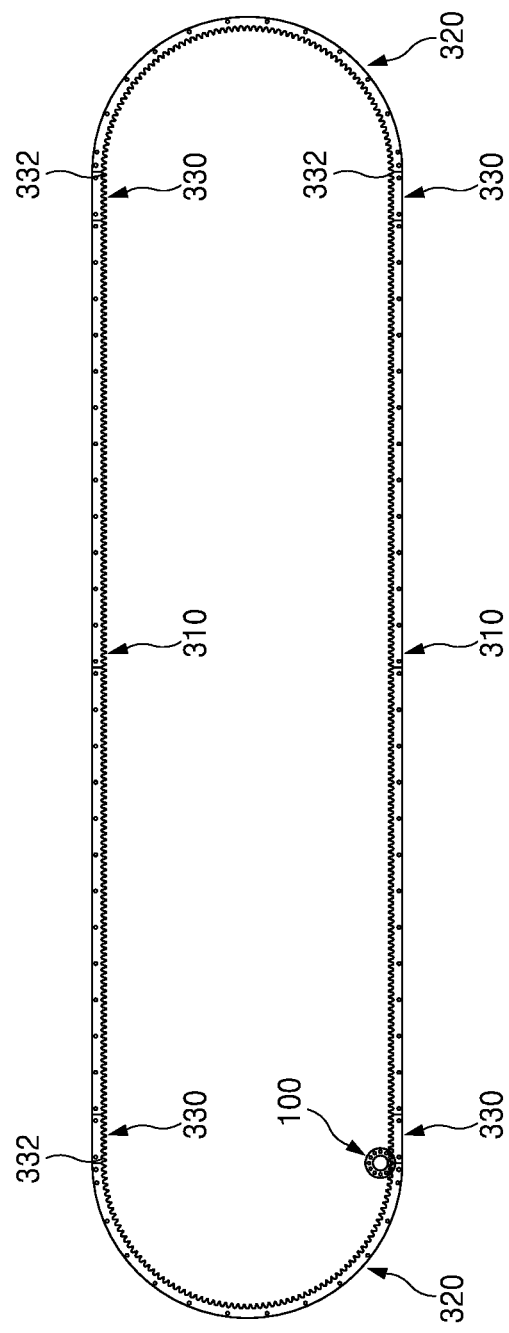
FIG. 7 is a structural plan view of a power transmission apparatus according to a third embodiment of the present inventive concept.
Figure 8:
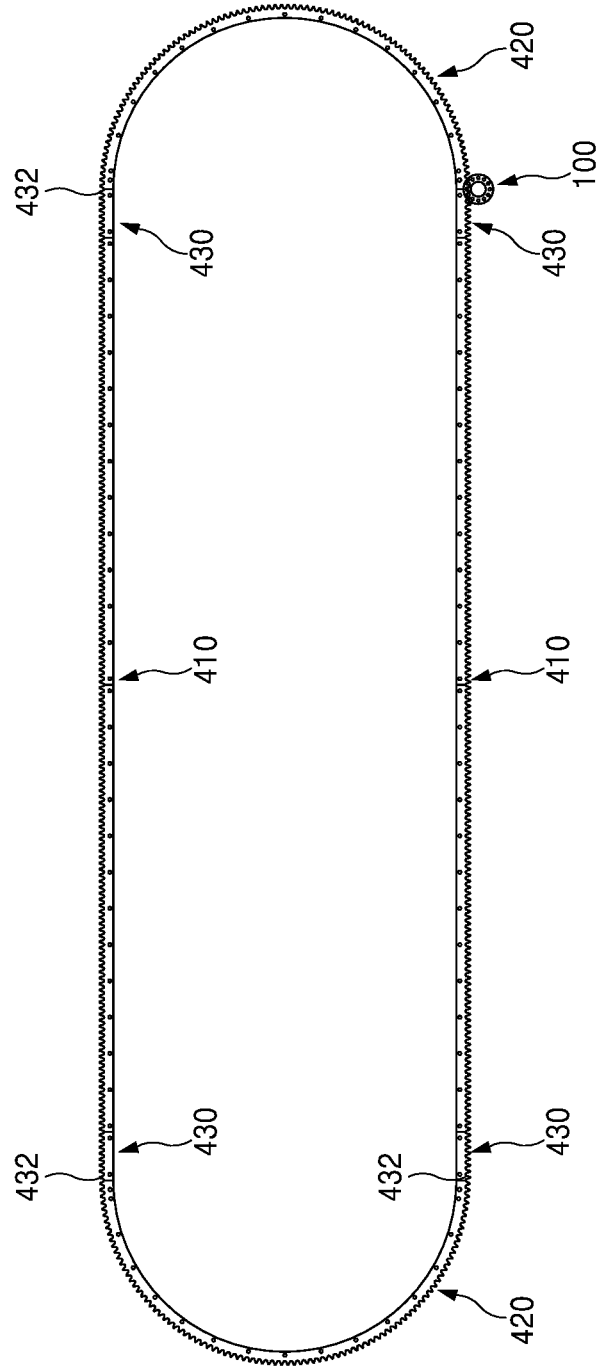
FIG. 8 is a structural plan view of a power transmission apparatus according to a fourth embodiment of the present inventive concept.

FIG. 7 is a structural plan view of a power transmission apparatus according to a third embodiment of the present inventive concept. FIG. 8 is a structural plan view of a power transmission apparatus according to a fourth embodiment of the present inventive concept.

The power transmission apparatuses illustrated in FIGS. 7 and 8 each have a structure in which rectilinear-curvilinear conversion racks 330 and 430 respectively having rectilinear-curvilinear conversion teeth 332 and 432 are connected to end portions of a pair of curvilinear racks 320 and 420, each having a semi-circular shape, and the rectilinear racks 310 and 410 are connected between the rectilinear-curvilinear conversion racks 330 and 430, forming one closed loop.

In this state, the pinion 100 may continuously rotate along the racks 310 to 330 and 410 to 430, inscribing (FIG. 7) or circumscribing (FIG. 8) the racks 310 to 330 and 410 to 430.

In the above structure, since the rectilinear racks 310 and 410 and the curvilinear racks 320 and 420 are connected by the rectilinear-curvilinear conversion racks 330 and 430, the pinion 100 may easily perform motions according to the inscription (FIG. 7) or the circumscription (FIG. 8).

Even when the structure of the present embodiment is employed, the continuous connection between a linear tooth shape and a curved tooth shape may be possible, thereby implementing continuous rectilinear and curvilinear motions of the INDEX applied to semiconductor or flat display equipment.

Figure 9:
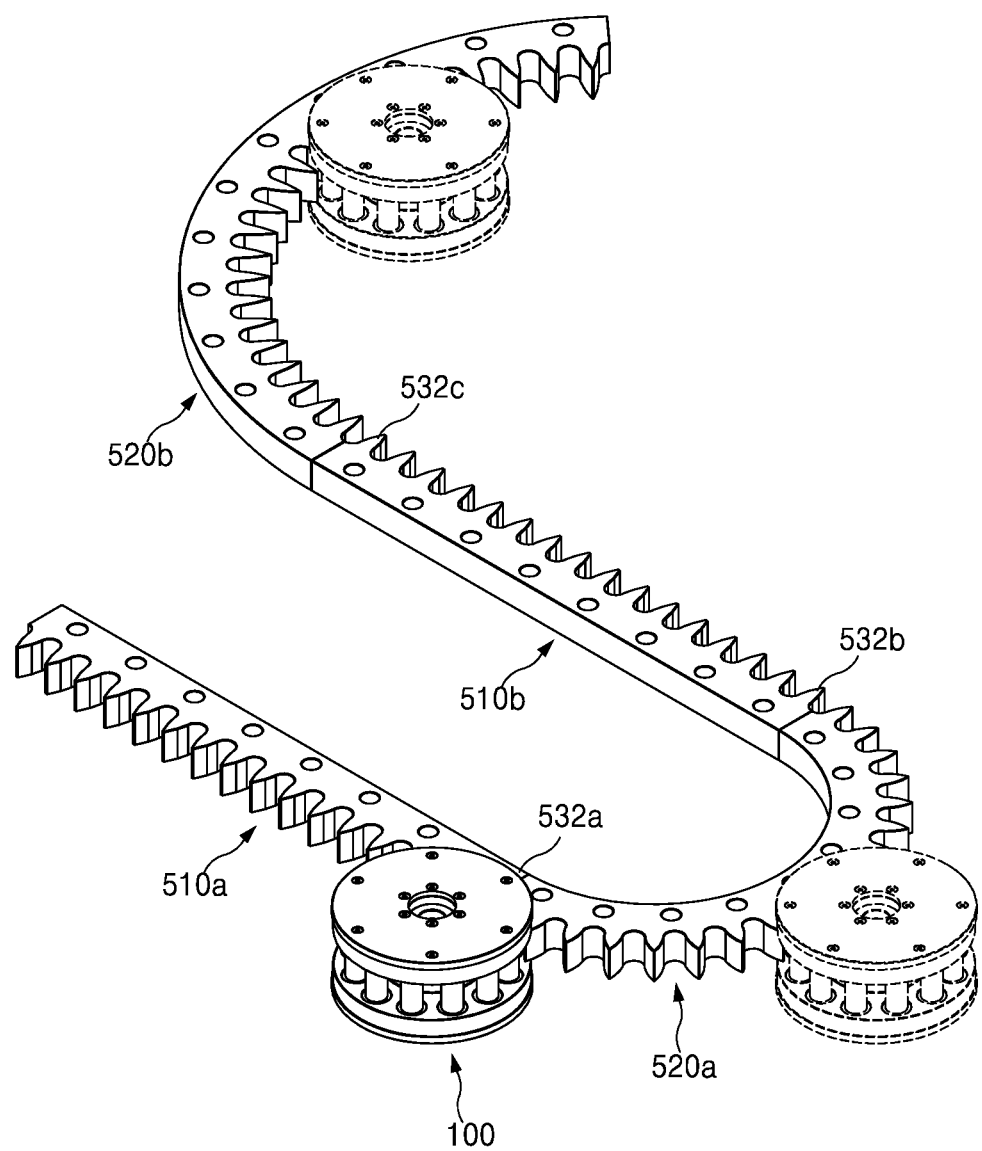
FIG. 9 is a structural plan view of a power transmission apparatus according to a fifth embodiment of the present inventive concept.

FIG. 9 is a structural plan view of a power transmission apparatus according to a fifth embodiment of the present inventive concept.

Referring to FIG. 9, the power transmission apparatus according to the present embodiment has a structure in which first and second curvilinear racks 520a and 520b having different curvatures are connected by first and second rectilinear racks 510a and 510b.

In the above structure, rectilinear-curvilinear conversion teeth 532a to 532c may be provided, singly or by twos, at end portions of the first and second rectilinear racks 510a and 510b.

In addition, since a first rectilinear rack 510a is directly connected to a first curvilinear rack 520a, one or two rectilinear-curvilinear conversion teeth 532a may be formed at an end portion of the first rectilinear rack 510a connected to the first curvilinear rack 520a. The structure and feature of the rectilinear-curvilinear conversion tooth 532a are the same as those in the above-described embodiment.

In contrast, unlike the first rectilinear rack 510a, since the first and second curvilinear racks 520a and 520b are connected to opposite end portions of a second rectilinear rack 510b, rectilinear-curvilinear conversion teeth 532b and 532c are formed at opposite end portions of the second rectilinear rack 510b. In this state, since the curvatures of the first and second curvilinear racks 520a and 520b are different from each other, the curvatures of tooth shapes at opposite side surfaces of the rectilinear-curvilinear conversion teeth 532b and 532c formed at opposite end portions of the second rectilinear rack 510b may also be different from each other.

Even when the structure of the present embodiment is employed, the continuous connection between a linear tooth shape and a curved tooth shape may be possible, thereby implementing continuous rectilinear and curvilinear motions of the INDEX applied to semiconductor or flat display equipment.

Figure 10:
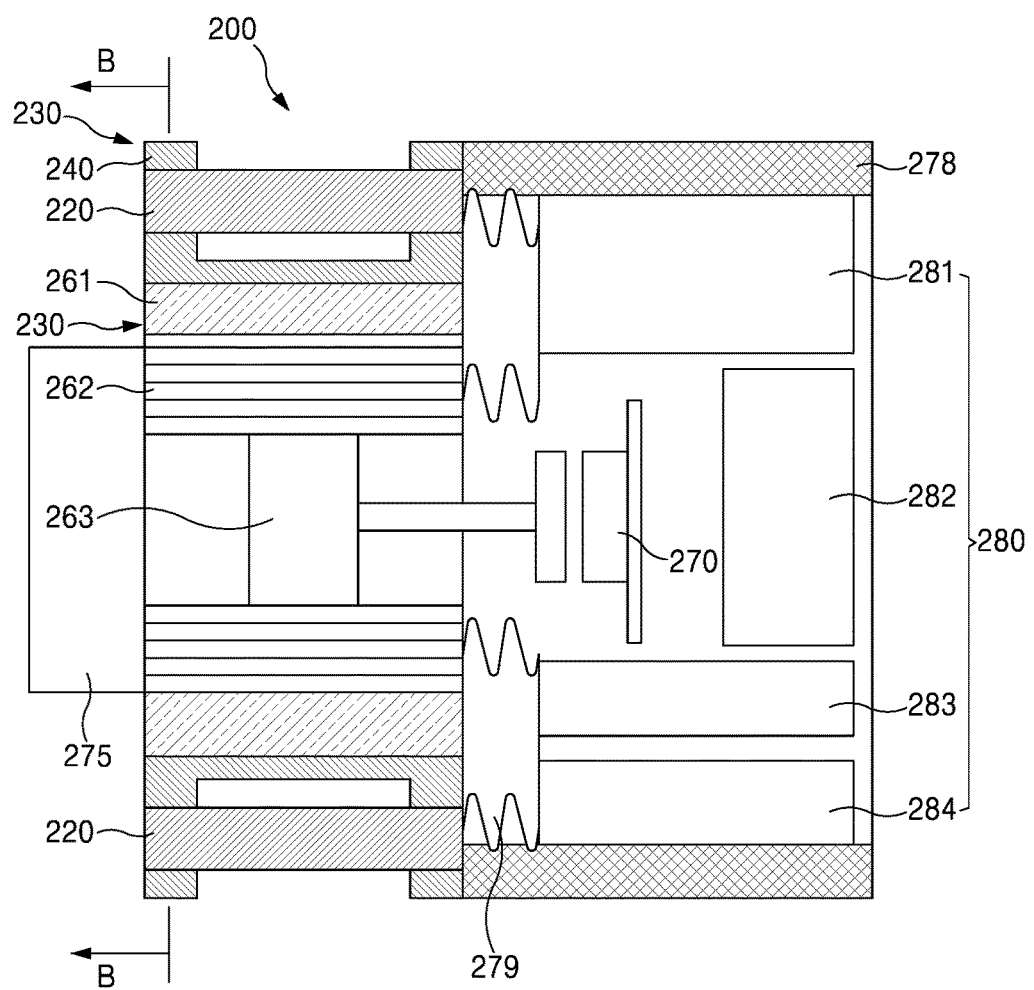
FIG. 10 is a schematic inner structural view of a pinion according to a modified embodiment.
Figure 11:
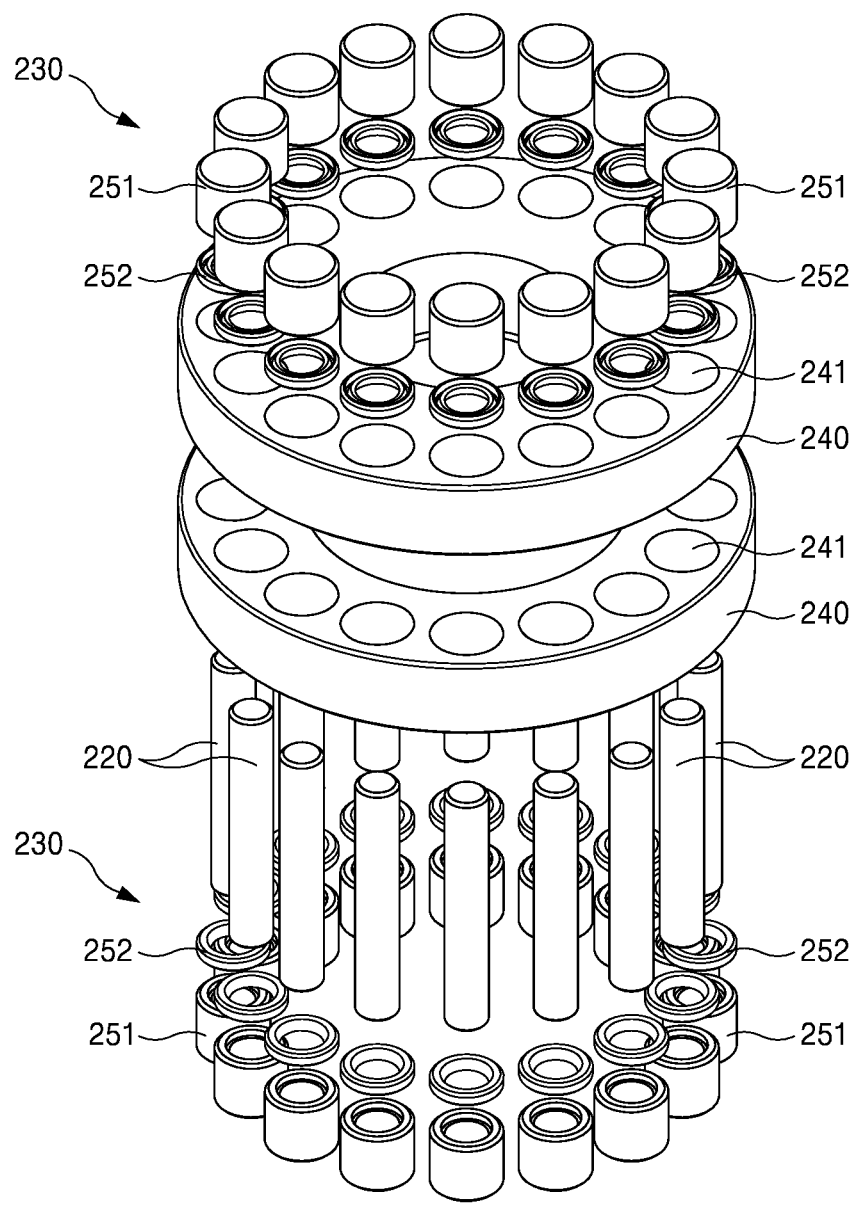
FIG. 11 is an exploded perspective view of a power transfer pin and a pin rotation support portion illustrated in FIG. 10.
Figure 12:
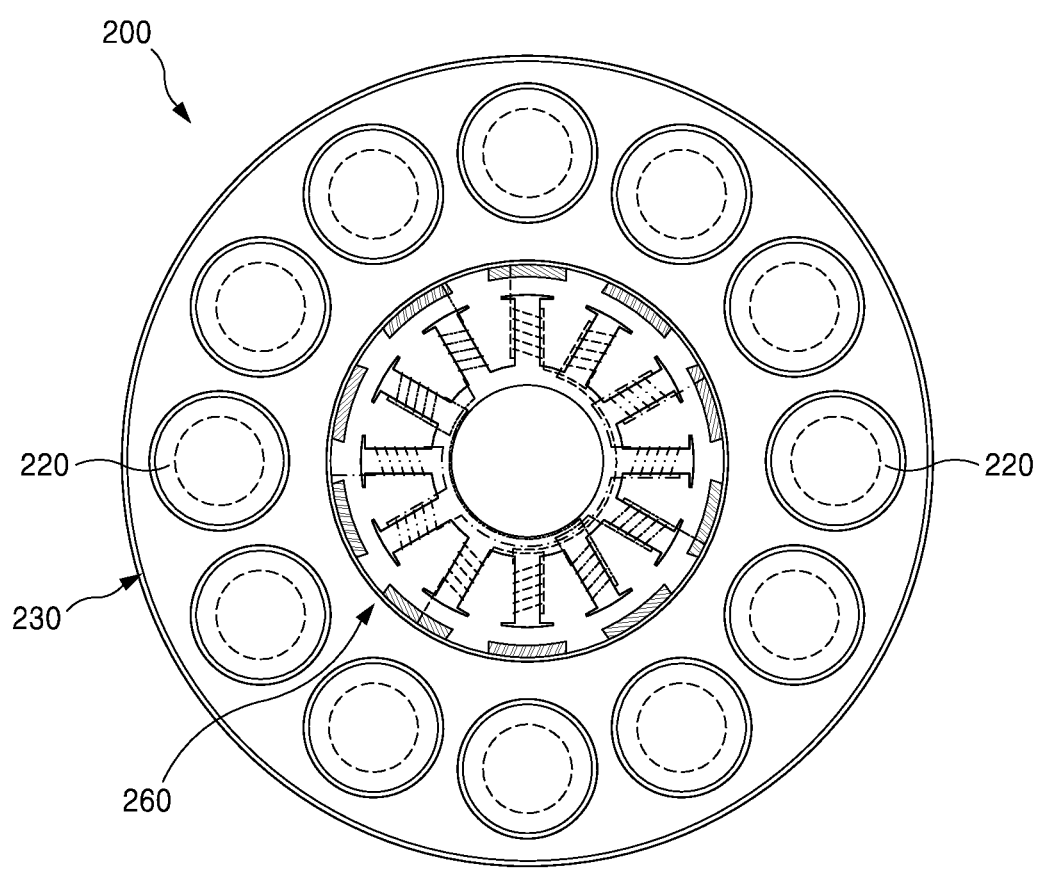
FIG. 12 is a cross-sectional view taken along line B-B of FIG. 10.
Figure 13:
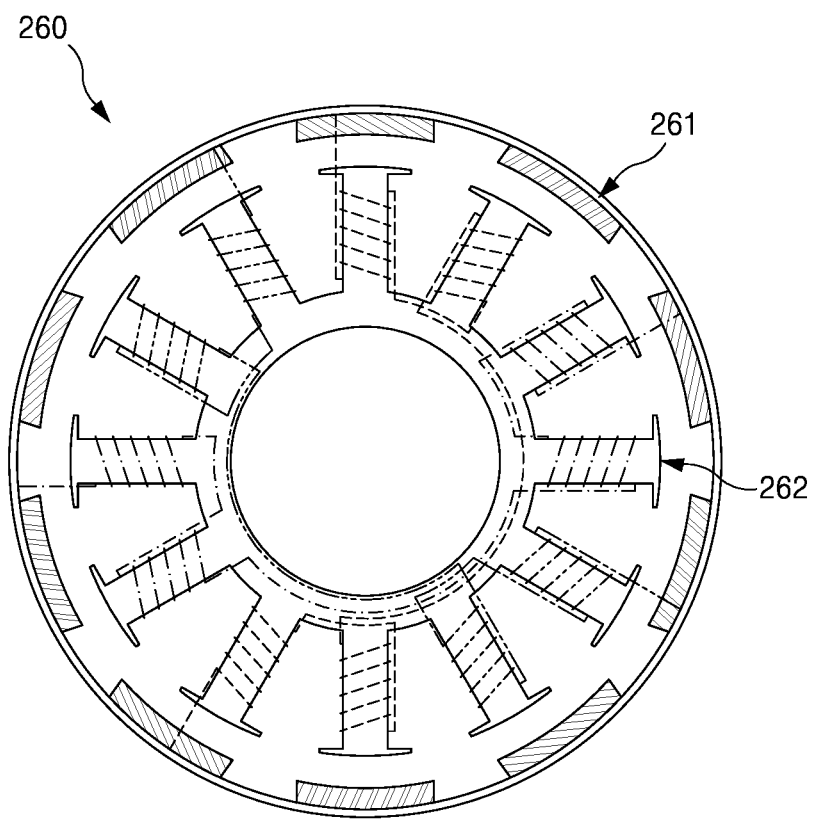
FIG. 13 is an enlarged view of an external rotor motor portion illustrated in FIG. 12.

FIG. 10 is a schematic inner structural view of a pinion according to a modified embodiment. FIG. 11 is an exploded perspective view of a power transfer pin and a pin rotation support portion illustrated in FIG. 10. FIG. 12 is a cross-sectional view taken along line B-B of FIG. 10. FIG. 13 is an enlarged view of an external rotor motor portion illustrated in FIG. 12.

The structure of a pinion 200 may be of an outer-rotor motor type as illustrated in FIG. 10. As described above, various pinions such as a lubrication hole pinion or a pinion with a built-in decelerator may be used as the pinion 200.

Referring to FIGS. 10 to 13, the pinion 200 device may include a plurality of power transfer pins 220 having an arrangement structure of a circular shape, a pin rotation support portion 230 rotatably supporting the power transfer pins 220, and an external rotor motor portion 260 arranged inside in a radial direction of the pin rotation support portion 230 and generating rotational power to rotate the pin rotation support portion 230.

The power transfer pins 220 interact with racks (not shown) described in the above-described embodiments.

The pin rotation support portion 230 is a structure connected to the power transfer pins 220 having a circular arrangement structure, and rotatably supports the power transfer pins 220.

The pin rotation support portion 230 may include a rotor connection body 240, a pin support bearing 251, and an oil seal 252.

The rotor connection body 240 is a structure rotatably supporting the power transfer pins 220 and forming one body with a rotor 261. The rotor connection body 240 is arranged in a pair respectively at opposite end portions of the power transfer pins 220 and connected to the power transfer pins 220.

In other words, the rotor connection body 240 is arranged in a pair spaced apart in parallel from each other by a length of the power transfer pins 220 or less. The pair of rotor connection bodies 240 are connected to the opposite end portions of the power transfer pins 220 and rotatably supporting the power transfer pins 220.

A plurality of pin insertion support holes 241, in which the power transfer pins 220 are inserted and supported, are provided in the rotor connection body 240 at equiangular intervals along a circumferential direction.

The pin support bearing 251 is arranged as many as the number of the power transfer pins 220 at the equiangular intervals along the circumferential direction of the rotor connection body 240, and support a rotation motion of the power transfer pins 220. The pin support bearing 251 may employ various rolling bearings having superior rigidity including a ball bearing.

The oil seal 252 is provided corresponding to the pin support bearing 251 one by one and seals the pin insertion support hole 241 in the rotor connection body 240 in which the power transfer pins 220 are inserted and supported.

In the present embodiment, since the rotor connection body 240 is provided in a pair, the pin support bearing 251 and the oil seal 252 are applied to each of the pair of the rotor connection bodies 240. In other words, the rotor connection body 240, the pin support bearing 251, and the oil seal 252 may form a symmetric structure with respect to the power transfer pins 220. Accordingly, an assembly work may be easy.

The external rotor motor portion 260 is arranged inside in the radial direction of arranged inside in the radial direction of the pin rotation support portion 230 and connected to the pin rotation support portion 230, and generates rotational power to rotate the pin rotation support portion 230 arranged outside the external rotor motor portion 260.

In other words, in the power transmission apparatus 200 of the present embodiment, while the external rotor motor portion 260 is arranged inside the pin rotation support portion 230, the external rotor motor portion 260 rotates the pin rotation support portion 230 and the power transfer pins 220 that are structures arranged outside the external rotor motor portion 260. In this case, not only a complicated structure of directly connecting a separate motor is not needed, but also the overall height of a device as well as the exterior size thereof may be remarkably reduced.

The external rotor motor portion 260 is connected to the pin rotation support portion 230 inside in the radial direction of the pin rotation support portion 230, and may include the rotor 261 rotated with the pin rotation support portion 230 and a stator 262 fixedly arranged inside in a radial direction of the rotor 261 and rotating the rotor 261 by an applied current.

The rotor 261 is provided as a magnet, and the stator 262 is provided as a coil structure with an electric line wound therearound. Accordingly, when current is applied to the stator 262, a magnetic force is generated according to the Fleming's law.

Since the rotor connection body 240 is coupled to the rotor 261, as the rotor 261 rotates, the rotor connection body 240 rotates together and thus the power transfer pins 220 may be induced to be rotated.

A fixed shaft 263 is provided inside the stator 262. Unlike the rotor 261 that is rotatable, the fixed shaft 263 is fixed without being rotated.

Accordingly, the fixed shaft 263 may be provided with a sensor such as an absolute position sensor 270. In the present embodiment, the absolute position sensor 270 is coupled to an end of the fixed shaft 263 and senses absolute positions of the power transfer pins 220. For example, when the absolute positions are misaligned, a control of, for example, forcibly stopping the motion of the external rotor motor portion 260 may be performed.

A closing cap 275 for protecting the external rotor motor portion 260 is provided around the external rotor motor portion 260. The closing cap 275 may protect the external rotor motor portion 260. When the closing cap 275 is open, a path for maintenance and repair of the external rotor motor portion 260 may be formed.

A heat sink 278 for radiating heat generated from the external rotor motor portion 260 is provided around the power transfer pins 220 at an opposite side of the closing cap 275.

The heat sink 278 may have a housing structure in which various control circuits 280 for controlling the power transmission apparatus 200 according to the present embodiment are provided.

The control circuits 280 may include a power circuit 281, a wireless communication circuit 282, an MCU circuit 283, and an external rotor motor portion drive circuit 284.

In the present embodiment, the power circuit 281, the wireless communication circuit 282, the MCU circuit 283, and the external rotor motor portion drive circuit 284 are all illustrated to be included, but some of them may be excluded in the application.

An air flow space portion 279 for air flow is formed in the heat sink 278 between the external rotor motor portion 260 and the control circuits 280. The air flow space portion 279 may prevent a phenomenon that the heat generated from the external rotor motor portion 260 is directly transferred to the control circuits 280 and thus the control circuits 280 is damaged.

While this inventive concept has been particularly shown and described with reference to preferred embodiments thereof, it will be understood by those of ordinary skill in the art that various changes in form and details may be made therein without departing from the spirit and scope of the inventive concept as defined by the appended claims. Therefore, the scope of the inventive concept is defined not by the detailed description of the inventive concept but by the appended claims, and all differences within the scope will be construed as being included in the present inventive concept.

INDUSTRIAL APPLICABILITY

The power transmission apparatus according to the present inventive concept may be used for various machine tools requiring a rotational motion or a rectilinear motion, industrial machinery, semiconductor or flat display manufacturing facilities, and various kinds of logistics transfer facilities.

The invention claimed is:
1. A power transmission apparatus, comprising:
a pair of curvilinear racks, each curvilinear rack comprising a semi-circular shape and a first end portion and a second end portion;
a plurality of rectilinear-curvilinear conversion racks, each rectilinear-curvilinear conversion rack comprising a first end portion and a second end portion, the first end portion of each rectilinear-curvilinear conversion rack being connected to a first end portion or a second end portion of a curvilinear rack; and
a plurality of rectilinear racks, each rectilinear rack being connected between the second end portions of two rectilinear-curvilinear conversion rack to form a closed loop,
wherein
each rectilinear rack allows a pinion to perform a rectilinear motion by interacting with the pinion;

each curvilinear rack allows the pinion to perform a curvilinear motion by interacting with the pinion; and each rectilinear-curvilinear conversion rack connects to the rectilinear rack and the curvilinear rack between the rectilinear rack and the curvilinear rack, and converts motion of the pinion between the rectilinear motion and the curvilinear motion, wherein the rectilinear-curvilinear conversion rack comprises:
  a rectilinear part having a rectilinear tooth and is connected to the rectilinear rack; and
  a rectilinear-curvilinear conversion part having at least one rectilinear-curvilinear conversion tooth, the rectilinear-curvilinear conversion part having a first side connected to the rectilinear part and a second side connected to the curvilinear rack, wherein the rectilinear-curvilinear conversion rack is separately and independently connected to each of the rectilinear rack and the curvilinear rack, wherein the rectilinear part and the rectilinear-curvilinear conversion part are integrally formed, wherein tooth shapes of opposite side surfaces of the rectilinear-curvilinear conversion tooth are asymmetrically formed with respect to a centerline, wherein a curvature of a first tooth shape formed at a first side surface of the rectilinear-curvilinear conversion tooth matches a curvature of a third tooth shape of teeth formed at the curvilinear rack, wherein a curvature of a second tooth shape formed at a second side surface of the rectilinear-curvilinear conversion tooth matches a curvature of a fourth tooth shape of teeth formed at the rectilinear rack, wherein tooth shape curves of the rectilinear rack, the curvilinear rack, and the rectilinear-curvilinear conversion rack are cycloid curves or trochoid curves, and wherein a curvature of the second tooth shape formed at the second side surface of the rectilinear-curvilinear conversion tooth comprises a convex curved shape.

2. The power transmission apparatus of claim 1, wherein the pinion comprises a plurality of power transfer pins having an arrangement structure of a circular shape and rotates corresponding to tooth shapes of the rectilinear rack and the curvilinear rack.

3. The power transmission apparatus of claim 2, wherein the pinion further comprises:
  a pin rotation support part connected to the power transfer pins and rotatably supporting the power transfer pins; and
  an external rotor motor arranged inside a radial direction of the pin rotation support part and connected to the pin rotation support part, and generating rotational power to rotate the pin rotation support part arranged outside a portion of the external rotor motor.

4. The power transmission apparatus of claim 3, wherein the pin rotation support part rotatably supports the power transfer pins and comprises a rotor connection body forming one body with a rotor, and
  the rotor connection body is arranged in a pair respectively at opposite end portions of the power transfer pins and connected to the power transfer pins.

5. The power transmission apparatus of claim 1, further comprising a pinion that includes a pinion body having a disc shape and a plurality of power transfer pins coupled to the pinion body, a surface of a power transfer pin of the plurality of power transfer pins engaging the first tooth shape and the second tooth shape of the rectilinear-curvilinear conversion tooth, and the surface of the power transfer pin of the plurality of power transfer pins comprising a circular shape,
  wherein a bottom land on either side of a rectilinear-curvilinear conversion tooth comprising a shape that matches the circular shape of the surface of the power transfer pin.

* * * * *